(12) United States Patent
Lupa et al.

(10) Patent No.: US 9,492,942 B2
(45) Date of Patent: *Nov. 15, 2016

(54) MATERIAL FORMING APPARATUS

(71) Applicant: SD Machinery, LLC, North Aurora, IL (US)

(72) Inventors: Donald S. Lupa, North Aurora, IL (US); Steve B. Torre, Rockford, IL (US)

(73) Assignee: SD MACHINERY, LLC, North Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,331

(22) Filed: Mar. 27, 2015

(65) Prior Publication Data

US 2015/0197032 A1 Jul. 16, 2015

Related U.S. Application Data

(63) Continuation of application No. 13/621,636, filed on Sep. 17, 2012, now Pat. No. 9,004,900.

(60) Provisional application No. 61/536,391, filed on Sep. 19, 2011.

(51) Int. Cl.
    *B29C 53/02* (2006.01)
    *B27H 1/00* (2006.01)
    *B29C 53/04* (2006.01)
    (Continued)

(52) U.S. Cl.
    CPC ............... *B27H 1/00* (2013.01); *B29C 53/02* (2013.01); *B29C 53/04* (2013.01); *B29K 2101/12* (2013.01); *B29K 2105/253* (2013.01)

(58) Field of Classification Search
    CPC ................... B27H 1/00; B29C 53/04
    USPC ......... 144/381, 256.1, 255, 269, 270, 256.2, 144/267, 268, 271, 262; 425/169, 193, 194, 425/328, 374, 520
    See application file for complete search history.

(56) References Cited

U.S. PATENT DOCUMENTS 5,199,475 A * 4/1993 Koeder .................... B27H 1/00
    144/256.1
6,151,938 A 11/2000 Park
(Continued)

FOREIGN PATENT DOCUMENTS

CH      264378      10/1949
DE      3300843      7/1984
(Continued)

OTHER PUBLICATIONS

European Patent Office, Supplementary European Search Report Issued in Application No. 12834353.0, Corresponding to PCT Application No. PCT/US2012/055816, Apr. 24, 2015, 2 pp.
(Continued)

*Primary Examiner* — Alison L Hindenlang
*Assistant Examiner* — Robert J Grun
(74) *Attorney, Agent, or Firm* — Fitch, Even, Tabin & Flannery LLP (57) ABSTRACT

A material forming apparatus is disclosed herein having a plurality of bed arms or members, a plurality of clamps connected to the bed arms or members and positioned to receive a piece of material to be formed, and the bed arms or members are movable to bend the piece of material to be formed into a desired shape.

8 Claims, 6 Drawing Sheets

(51) Int. Cl.
  *B29K 101/12* (2006.01)
  *B29K 105/00* (2006.01)

(56) References Cited

U.S. PATENT DOCUMENTS

| | | | |
|---|---|---|---|
| 9,004,900 B2 * | 4/2015 | Lupa et al. | 425/374 |
| 2008/0295556 A1 | 12/2008 | Hodgson | |

FOREIGN PATENT DOCUMENTS

| | | |
|---|---|---|
| DE | 4103893 | 5/1995 |
| EP | 2420366 | 2/2012 |
| FR | 2553023 | 4/1985 |
| RU | 2133163 | 7/1999 |
| RU | 14028 | 6/2000 |
| RU | 2261640 | 10/2005 |
| RU | 2274786 | 4/2006 |
| RU | 2399450 | 5/2006 |
| SU | 1147471 | 3/1985 |
| SU | 1659191 | 6/1991 |

OTHER PUBLICATIONS

International Search Report Corresponding to International Application No. PCT/US2012/055816, Dec. 13, 2012, 1 p.
Patent Cooperation Treaty, International Searching Authority, Notification of Transmittal of the International Search Report and the Written Opinion of the International Searching Authority, or the Declaration, Corresponding to International Application No. PCT/US2013/060223, Feb. 13, 2014, 7 pp.

* cited by examiner

FIG. 5 ically employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

MATERIAL FORMING APPARATUS

CROSS-REFERENCE TO RELATED APPLICATIONS

This application is a continuation of U.S. application Ser. No. 13/621,636, filed Sep. 17, 2012, which claims the benefit of U.S. Provisional Application 61/536,391, filed Sep. 19, 2011, which are both incorporated by reference in their entirety.

TECHNICAL FIELD & BACKGROUND

Traditional material forming apparatuses are limited in that they can often form only one fixed radius fixture at a time to form a material into a specific radius shape.

It is an object of the invention to provide a material forming apparatus that can be dialed into a plurality of unlimited radii to provide a platform to form one or more various materials into a specific radius shape.

It is an object of the invention to provide a material forming apparatus that saves time and money by eliminating a need to build a plurality of fixed radius fixtures that only work for a specific shape.

It is an object of the invention to provide a material forming apparatus that can be used to form wood for curved moldings, panels and other suitable wood products, but is not limited to any other material that uses one or more fixed molding forms through the use of one or more fixtures and clamps.

It is an object of the invention to provide a material forming apparatus that can be used to thermoform plastics and acrylics to a desired radius by providing a forming platform after being heated to a specified temperature.

What is really needed is a material forming apparatus that saves time and money by eliminating a need to build a plurality of fixed radius fixtures that only work for a specific shape that saves time and money by eliminating a need to build a plurality of fixed radius fixtures that only work for a specific shape that can be used to form wood for curved moldings, panels and other suitable wood products, but is not limited to any other material that uses fixed one or more molding forms through the use of one or more fixtures and clamps that can be used to thermoform plastics and acrylics to a desired radius by providing a forming platform after being heated to a specified temperature.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
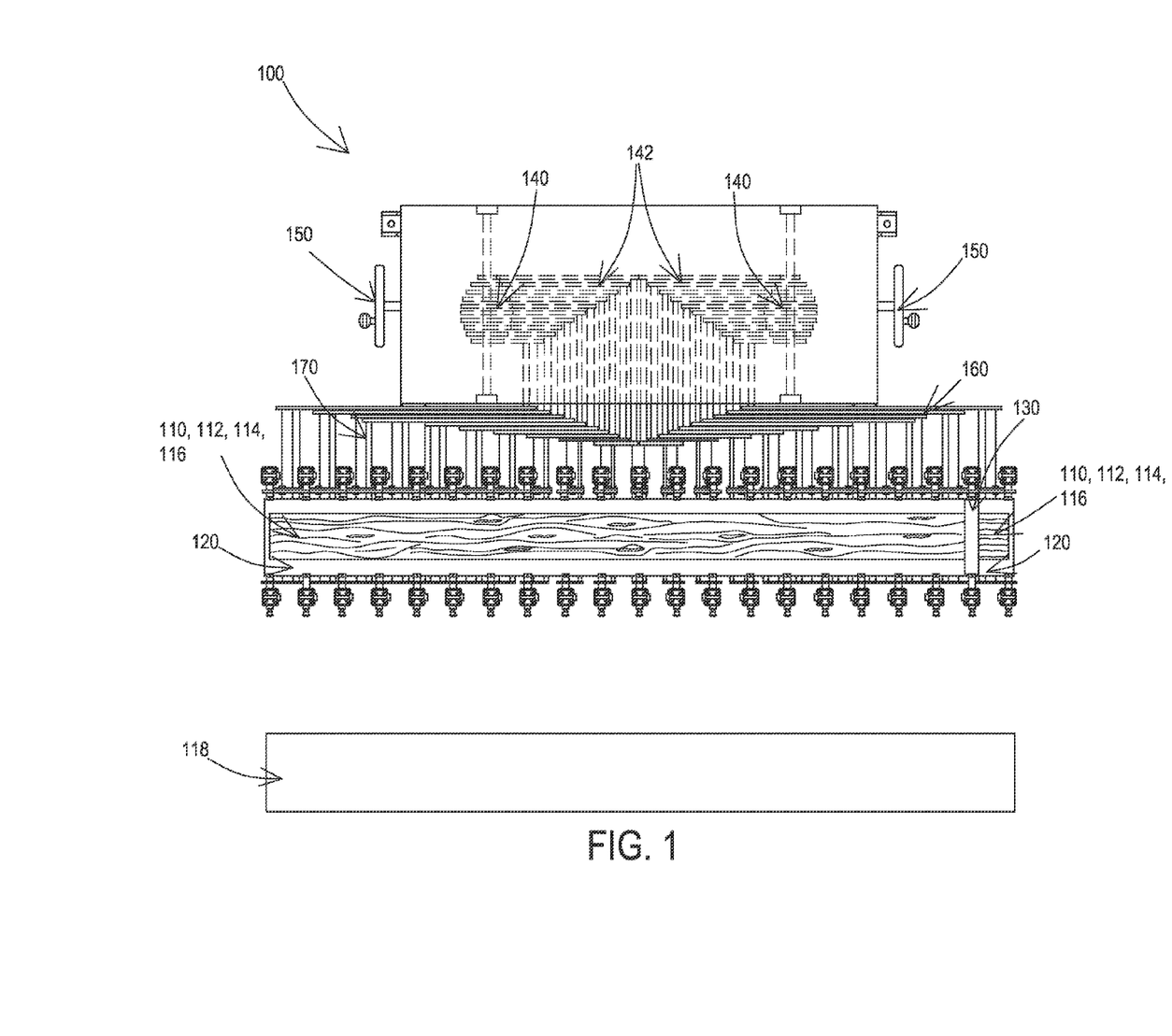
FIG. 1 illustrates a top plan view of a material forming apparatus, in accordance with one embodiment of the present invention.

FIG. 1 illustrates a top view of a material forming apparatus 100, in accordance with one embodiment of the present invention.

The material forming apparatus 100 includes a piece of material 110, a flexible bed 120, a plurality of roller clamps 130, a plurality of drive gears 140, one or more cranks 150, a plurality of pivoting arms 160 and a plurality of bed arms 170. The piece of material 110 can include a piece of laminated wood 112, a piece of thermoform plastic 114, a piece of acrylic 116 or other suitable material. A cover sheet 118 made of plastic material or other suitable material that is approximately in the range of ⅛th of an inch to ¼th of an inch in thickness is placed over the piece of material 110 to provide protection to the piece of material 110. The flexible bed 120 receives the piece of material 110 that is removably placed on the flexible bed 120 to be shaped. The flexible bed 120 is typically made of plastic but can be made of any suitable material. The flexible bed 120 is approximately ¼ inch in thickness although the flexible bed 120 can be any suitable thickness. The roller clamps 130 are positioned above the piece of material 110 and the flexible bed 120 to assist shaping the piece of material 110. Additional details regarding the roller clamps 130 are described in subsequent FIGS. 2B, 3, and 5. The drive gears 140 are rotated to assist shaping the piece of material 110. Additional details regarding the drive gears 140 are described in subsequent FIGS. 2A, 2B and 4. The one or more cranks 150 is rotated to provide power to rotate the drive gears 140. The one or more cranks 150 can be one or more manual cranks 152 or one or more motorized cranks 154. The pivoting arms 160 are rotated by the rotation of the drive gears 140 and move the roller clamps 130 to force the flexible bed 120 and the piece of material 110 downward to form a reducing, concentric arc radius. Additional details regarding the pivoting arms 160 are described in subsequent FIGS. 2B, 3, 4 and 5. The plurality of bed arms 170 receive the roller clamps 130 that are placed over the piece of material 110 by locking onto the bed arms 170.

Figure 2A:
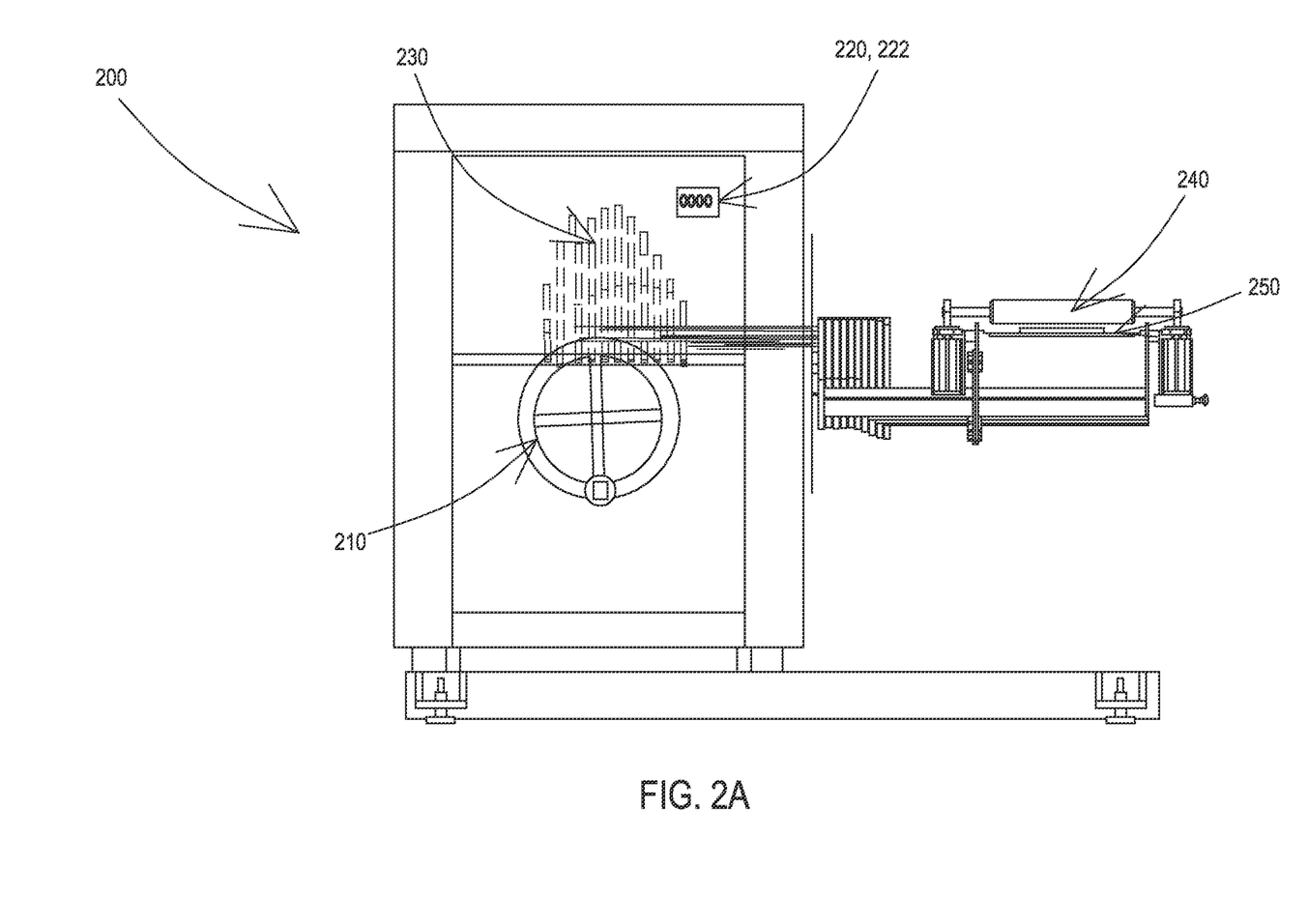
FIG. 2A illustrates a side elevation view of a material forming apparatus, in accordance with one embodiment of the present invention.

FIG. 2A illustrates a side view of a material forming apparatus 200, in accordance with one embodiment of the present invention. The material forming apparatus 200 illustrated in FIG. 2A is similar to the material forming apparatus 100 illustrated and described in FIG. 1 and its description. The material forming apparatus 200 illustrated in FIG. 2A includes one or more cranks 210, a numerical display 220, a plurality of drive gears 230, a roller clamp 240 and a piece of material 250. The one or more cranks 210, drive gears 230 and piece of material 250 are similar to the one or more cranks 150, the drive gears 140 and piece of material 110 illustrated and described in FIG. 1 and its description. The numerical display 220 is typically a digital display 222 that indicates when a desired predetermined length of a radius of the piece of material 250 is reached. The roller clamp 240 is placed over the piece of material 250 to assist shaping the piece of material 250. Additional details regarding the roller clamp 240 are described in subsequent FIGS. 2B and 3.

Figure 2B:
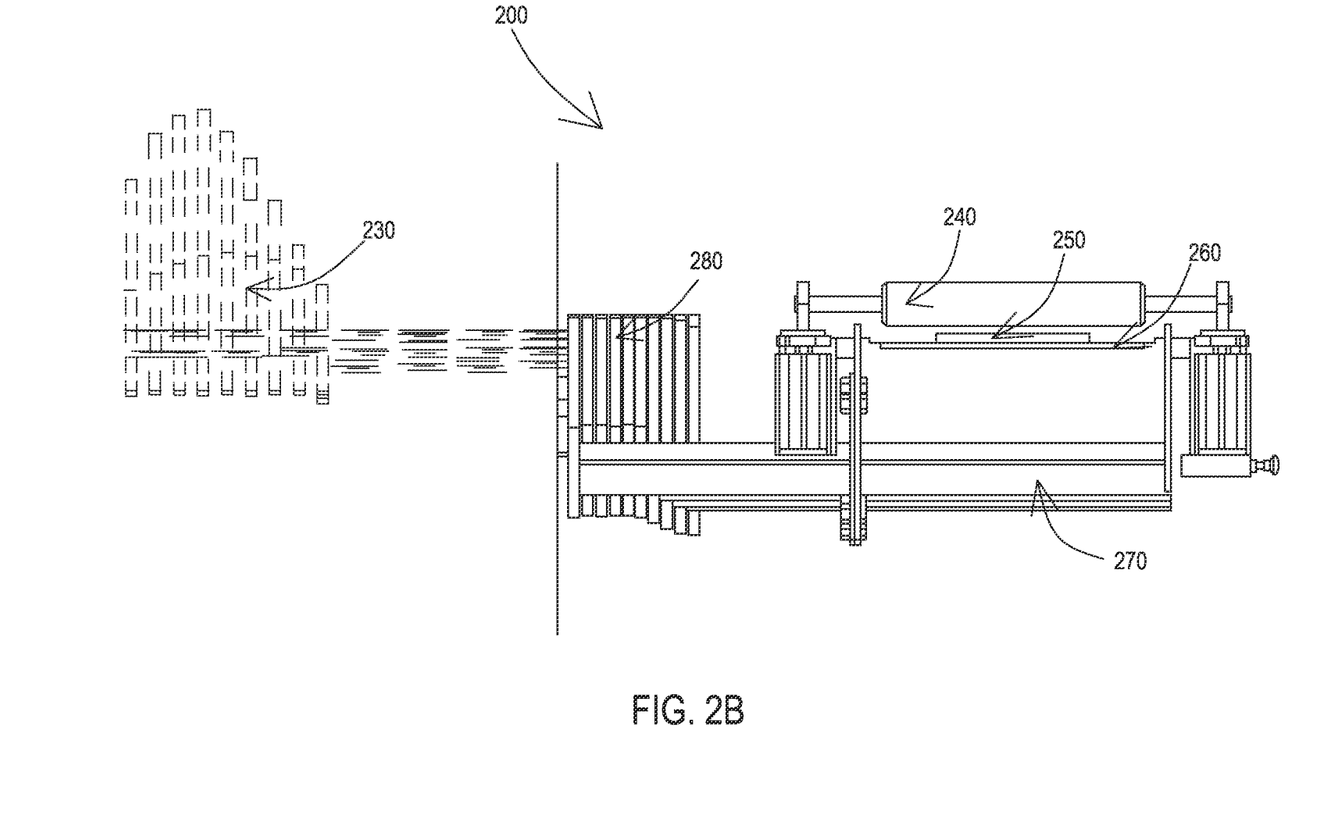
FIG. 2B illustrates an enlarged side elevation view of a the roller clamp of a the material forming apparatus of FIG. 2A.

FIG. 2B illustrates an enlarged side elevation view of roller clamp 240 of the material forming apparatus 200 of FIG. 2A, in accordance with one aspect of the present invention.

The material forming apparatus 200 illustrated and described in FIG. 2B is similar to the material forming apparatus 100 described in FIG. 1 and its description. The material forming apparatus 200 illustrated and described in FIG. 2B includes the piece of material 250, the flexible bed 260, the roller clamp 240, the plurality of bed arms 270, the drive gears 230 and the plurality of pivoting arms 280 that are similar to the piece of material 110, the flexible bed 120, the plurality of roller clamps 130, the plurality of bed arms 170, and the plurality of pivoting arms 160 that are described and illustrated in FIG. 1 and its description.

Figure 3:
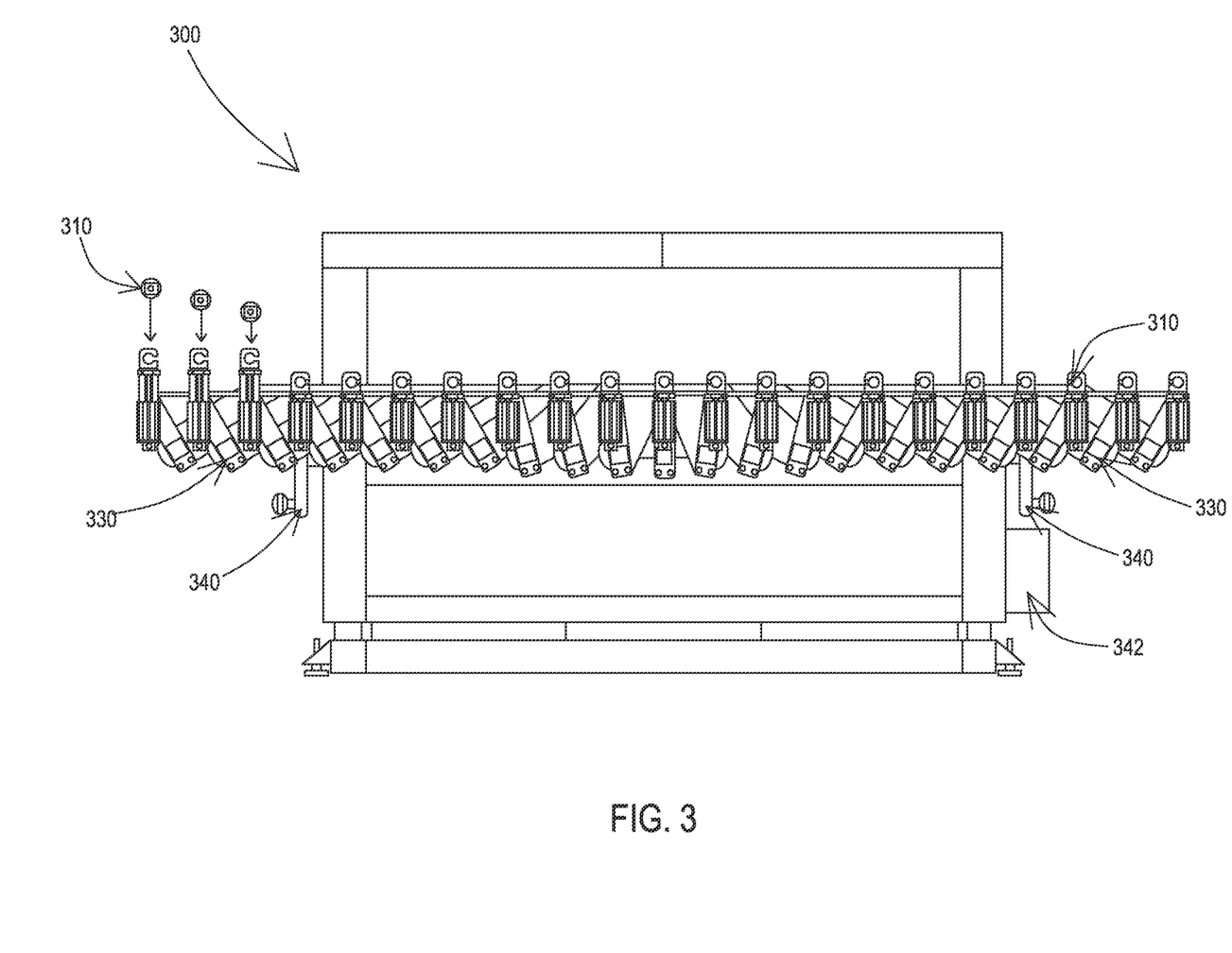
FIG. 3 illustrates a front elevation view of a material forming apparatus, in accordance with one embodiment of the present invention.

FIG. 3 illustrates a front view of a material forming apparatus 300, in accordance with one embodiment of the present invention.

The material forming apparatus 300 described and illustrated in FIG. 3 is similar to the material forming apparatus 100, 200 illustrated and described in FIGS. 1, 2A and 2B. The material forming apparatus 300 includes a plurality of roller clamps 310, a plurality of pivoting arms 330 and one or more cranks 340. The roller clamps 310, the pivoting arms 330 and the one or more cranks 340 illustrated and described in FIG. 3 are similar to the roller clamps 240, the pivoting arms 280 and the one or more cranks 210 illustrated and described in FIGS. 2A and 2B. The roller clamps 310 are placed over the piece of material (FIG. 2B, 250) by locking onto the bed arms (FIG. 2B, 270). The roller clamps 310 are closed down loosely to make contact with the piece of material 250. The drive gears 230 are rotated simultaneously by the one or more cranks 340 or a suitable motor 342, initiating rotation of each pivoting arm 330 independent of each other, at the rotation rate determined by a gear-ratio of each pivoting arm 330. The pivoting arms 330 move the bed arm 270 and the roller-clamp 310 forcing the flexible bed (FIG. 2B, 260) into an arc and the piece of material 250 to form a reducing, concentric, arc radius. The operator stops the rotation when the desired predetermined radius length is reached, indicated on the numerical display (FIG. 2A, 222). The roller clamps 310 are tightened down to hold the piece of material 250 together until a glue utilized to secure the piece of material 250 together dries or the piece of material 250 cools. The roller clamps 310 can be removed along with the newly formed piece of material 250 and the material forming apparatus 300 is ready to form a new part.

Figure 4:
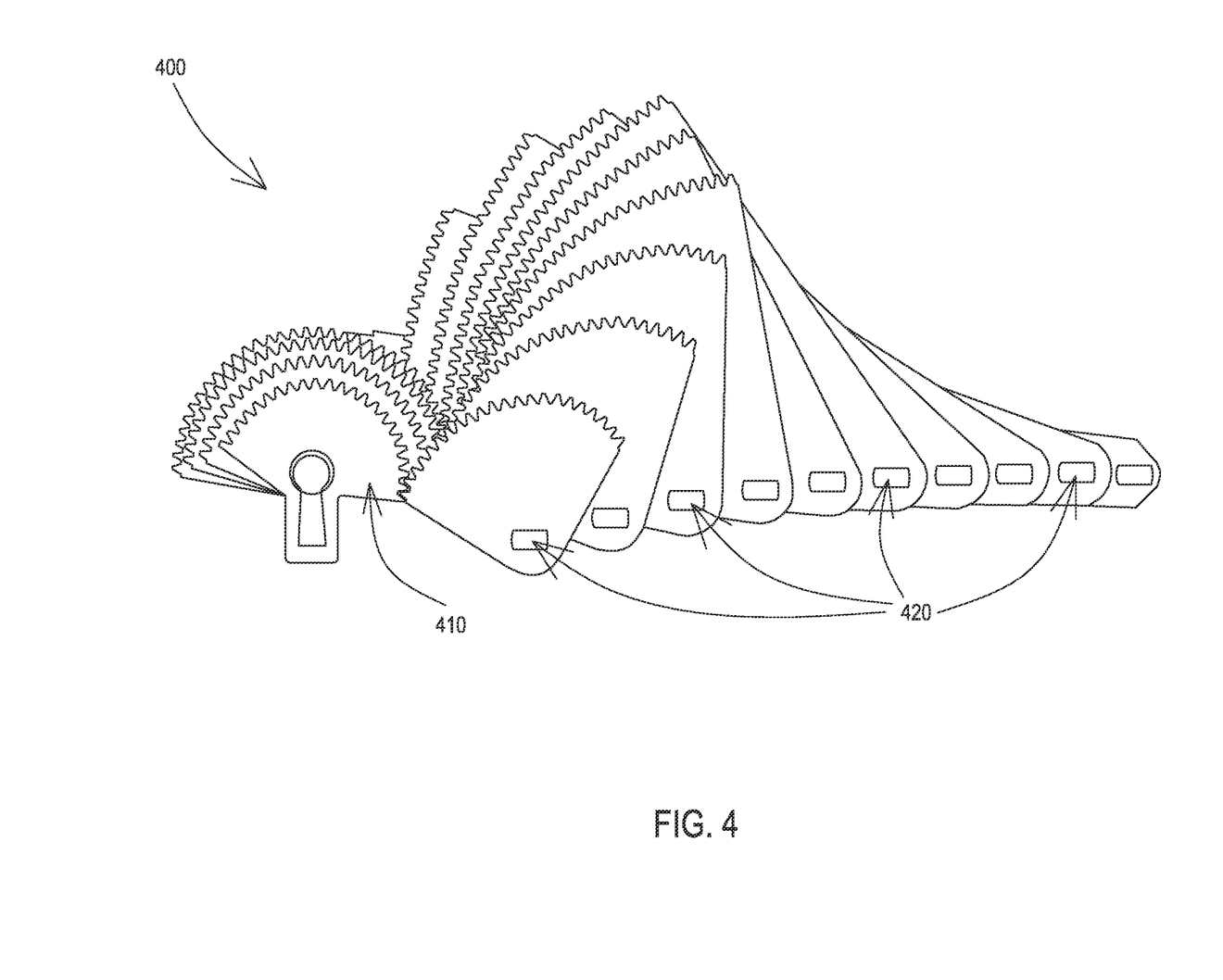
FIG. 4 illustrates a front elevation view of a plurality of drive gears and a plurality of driven gears, in accordance with one embodiment of the present invention.

FIG. 4 illustrates a front elevation view of a plurality of drive gears 410 and a plurality of driven gears 420 of a material forming apparatus 400, in accordance with one embodiment of the present invention.

The plurality of drive gears 410 and the plurality of driven gears 420 illustrated and described in FIG. 4 are similar to the plurality of drive gears 140 and 230 illustrated and described in FIGS. 1 and 2B. The plurality of drive gears 410 rotate and are engaged with the driven gears 420 and rotate the driven gears 420 and pivoting arms as previously illustrated and described with respect to drive gears 140 and pivoting arms 160 in FIG. 1 and its description.

Figure 5:
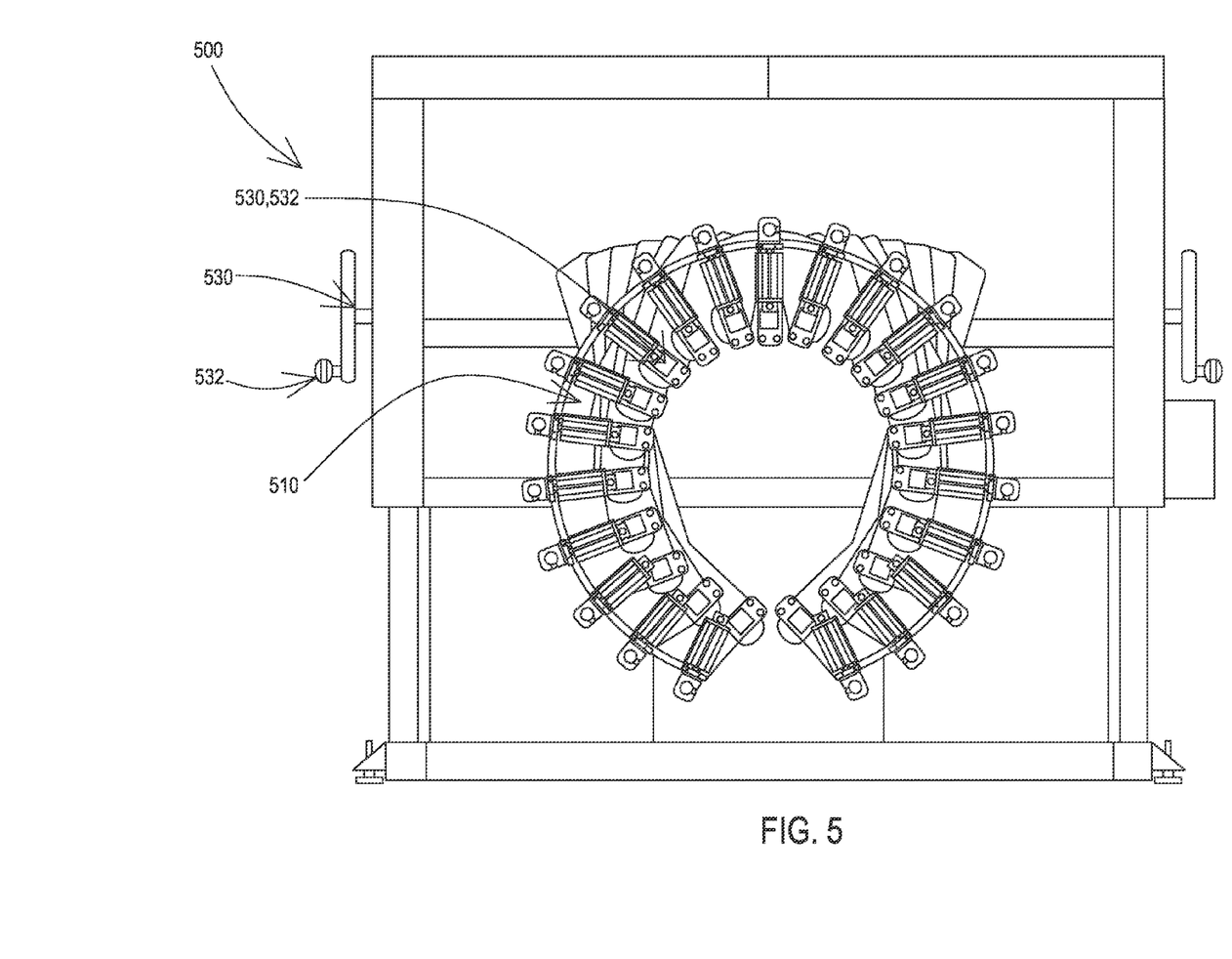
FIG. 5 illustrates a front elevation view of a plurality of pivoting arms, a plurality of pneumatic clamps and one or more cranks of a material forming apparatus in use, in accordance with one embodiment of the present invention.

FIG. 5 illustrates a front perspective view of a plurality of pivoting arms 510, a plurality of pneumatic clamps 520 and one or more cranks 530 of a material forming apparatus 500 in use, in accordance with one embodiment of the present invention.

The plurality of pivoting arms 510 and the one or more cranks 530 of the material forming apparatus 500 illustrated and described in FIG. 5 are similar to the plurality of pivoting arms 330 and one or more cranks 340 of material forming apparatus 300 illustrated and described in FIG. 3 and its description. The pneumatic clamps 520 are similar to the roller clamps 310 illustrated and described in FIG. 3 except that the roller clamps 520 illustrated and described in FIG. 5 and its description are pneumatic roller clamps 522. The one or more cranks 530 illustrated and described in FIG. 5 also have a grasping knob 532.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A material forming apparatus, comprising:
   a plurality of bed arms;
   a plurality of clamps connected to said bed arms and positioned to receive a piece of material to be formed; and
   a plurality of gears connected to the plurality of bed arms via pivoting arms, with the plurality of gears rotated to pivot said pivoting arms and move said bed arms to force said piece of material into a desired shape;
   wherein the plurality of gears comprises separate first and second sets of gears and the plurality of bed arms comprises separate first and second sets of bed arms, with the first set of gears coupled to the first set of bed arms and operable to move the first set of bed arms into desired positions, and the second set of gears coupled to the second set of bed arms and operable to move the second set of bed arms into desired positions.

2. The material forming apparatus of claim 1 wherein the first and second sets of gears are coupled to respective first and second drive gears which operate independent of each other so that the first set of gears and bed arms may be moved independently of the second set of gears and bed arms and vice versa.

3. The material forming apparatus of claim 2 further comprising first and second actuators, with the first actuator coupled to the first drive gear and operable to move the first set of bed arms, and the second actuator coupled to the second drive gear and operable to move the second set of bed arms.

4. The material forming apparatus of claim 1 wherein the plurality of clamps comprises at least one clamp per bed arm, with the clamps being movable between a first released position wherein the piece of material to be formed can be place on or removed from the bed arms and a second secured position wherein the piece of material to be formed is secured to the bed arms.

5. A material forming apparatus comprising:
a plurality of bed arms;
a plurality of clamps connected to said bed arms and positioned to receive a piece of material to be formed;
a plurality of gears connected to the plurality of bed arms via pivoting arms, with the plurality of gears rotated to pivot said pivoting arms and move said bed arms to force said piece of material into a desired shape;
wherein the plurality of clamps comprises at least one clamp per bed arm, with the clamps being movable between a first released position wherein the piece of material to be formed can be place on or removed from the bed arms and a second secured position wherein the piece of material to be formed is secured to the bed arms; and
a cover sheet positionable between the piece of material to be formed and the plurality of clamps to protect the piece of material to be formed.

6. A material forming apparatus, comprising:
a body;
a plurality of rotatable arms extending from said body with each arm having a bed member at an end thereof, the rotatable arms capable of being moved between a first position wherein the bed members form a flexible bed capable of supporting a material to be formed and a second position wherein the bed members bend the material to be formed into a desired shape;
a plurality of clamps connected to the bed arms and movable between a first released position wherein the material to be formed can be placed on or removed from the flexible bed and a second secured position wherein the material to be formed is secured to the flexible bed;
a plurality of gears positioned within the body and coupled to the plurality of rotatable arms, the gears being movable via an actuator to rotate the arms between the first and second position; and
wherein the plurality of gears comprises separate first and second sets of gears and the plurality of rotatable arms comprises separate first and second sets of rotatable arms, with the first set of gears coupled to the first set of rotatable arms and operable to move the first set of rotatable arms between the first and second positions, and the second set of gears coupled to the second set of rotatable arms and operable to move the second set of rotatable arms into desired positions.

7. The material forming apparatus of claim 6 wherein the plurality of clamps comprises one clamp per bed member so that the material to be formed may be coupled to each bed member.

8. The material forming apparatus of claim 6 wherein the first and second sets of gears are coupled to respective first and second drive gears which operate independent of one another so that the first set of gears and rotatable arms may be moved independently of the second set of gears and rotatable arms and vice versa, the rotatable arms further being staggered with respect to each other so that rotation of one rotating arm does not interfere with rotation of another rotating arm.

\* \* \* \* \*